Figure 6:
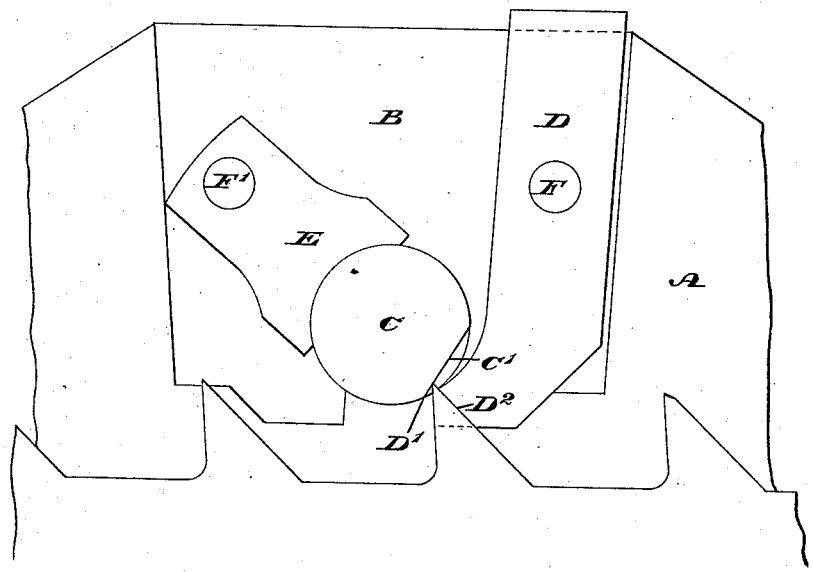

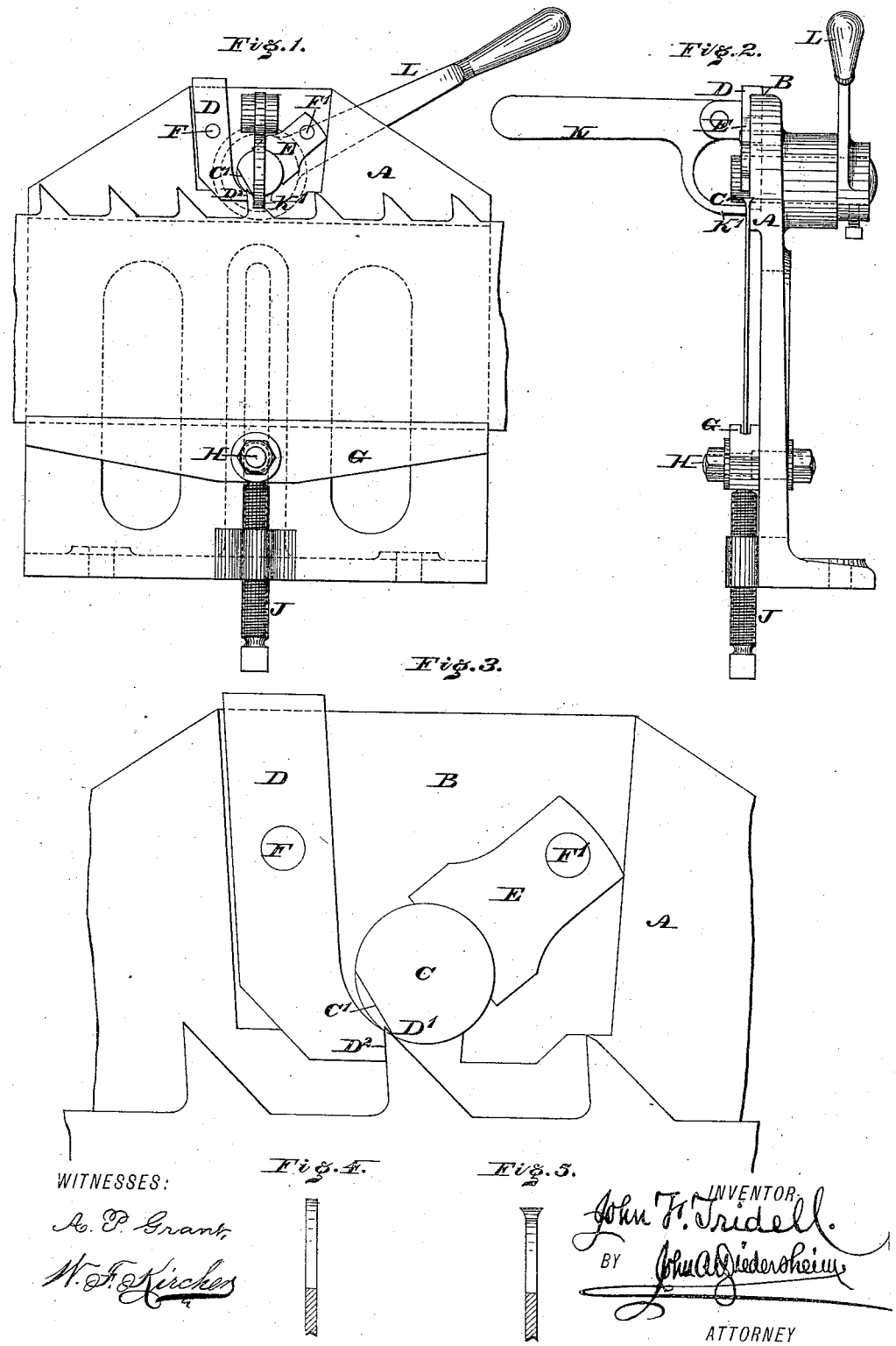

(No Model.)  2 Sheets—Sheet 2.

J. F. TRIDELL.
MACHINE FOR SWAGING SAW TEETH.

No. 382,062.  Patented May 1, 1888.

WITNESSES:
A. P. Grant
W. F. Kirches

INVENTOR:
John F. Tridell
BY John A. Wiedersheim
ATTORNEY.

UNITED STATES PATENT OFFICE.

JOHN F. TRIDELL, OF CLINTON, IOWA.

MACHINE FOR SWAGING SAW-TEETH.

SPECIFICATION forming part of Letters Patent No. 382,062, dated May 1, 1888.

Application filed March 23, 1886. Serial No. 196,235. (No model.)

*To all whom it may concern:*

Be it known that I, JOHN F. TRIDELL, a citizen of the United States, residing at Clinton, in the county of Clinton, State of Iowa, have invented a new and useful Improvement in Machines for Swaging Saw-Teeth, which improvement is fully set forth in the following specification and accompanying drawings, in which—

Figure 1 represents a front view of a machine for swaging saw-teeth embodying my invention. Fig. 2 represents a side elevation thereof. Fig. 3 represents an enlarged view of a portion thereof, and Fig. 6 is a similar view showing the parts in a different position. Fig. 4 represents an edge view prior to being acted upon by the machine, and Fig. 5 represents an edge view of the tooth as swaged.

Similar letters of reference indicate corresponding parts in the several figures.

My invention relates to improvements in machines for swaging the teeth of saws, particularly saws known as "band-saws," whose teeth are formed in the edge of an endless ribbon or band of steel.

The objects of the invention are, first, to accomplish the spreading or swaging of the points of the saw-teeth in a more effective and complete manner than heretofore, and, next, to secure uniformity in the swaging of the teeth of the saw, keeping it in "joint," as it is termed, insuring that the points of the teeth shall all be at equal distances from the back edge of the saw-blade. These objects are attained by means substantially as hereinafter set forth.

Referring to the drawings, A represents the main frame of the machine, the same being properly supported and having a vertical recess, B, within which are located a rotary die, C, a die-block, D, and die-support E.

The die C is mounted on the frame A and made of hardened steel of the form of a pin or cylinder, having a portion of its periphery cut away or flat, as at C', or an eccentric-shaped die may be employed in lieu thereof, so that in either case the corner or cutting or pinching off edge D' exists.

The die-block D and die-support are mounted on the frame on opposite sides of the die C, said support having the periphery of the die in contact with it for sustaining the same, and the block D having its lower end so disposed in relation to the die C as to form an abutment, $D^2$, it being noticed that the tooth to be swaged is adapted to enter between said abutment $D^2$ and the flat portion C' of the die C.

The block D and support E are sustained on pins F F', respectively, attached to the frame A and so disposed that said block and support are interchangeable in position and may be placed on either side of the die at will, enabling the machine to be used with the teeth of the saw facing in either direction, thus providing for swaging of teeth of right or left hand saws.

G represents a beam or support for the saw, the same being connected with the frame A by a bolt or pin, H, which is fitted in a vertical slot in said frame, the beam being vertically adjustable by means of a screw, J, the latter being fitted to a threaded boss on the lower part of the frame A.

K represents a clamp, which is pivoted to the upper part of the frame A and has its nose K' adapted to rest on the saw and press and hold the same against the adjacent part of the frame A.

The rotary die D is provided with a handle, L, for operating purposes.

The saw is placed against the front side of the frame A and the back edge thereof rested in a groove in the beam G, said beam being adjusted by the screw J so that the points of the saw-teeth are slightly higher than the abutment $D^2$ of the block D. The point of the tooth to be operated upon (see Fig. 4) is brought against said abutment and the saw firmly held by the hand-clamp K. The die C is now rotated, and the corner or edge D' of the die C rides upon the tooth, compressing the portion thereof in the path of travel of the die between the die and the abutment $D^2$ of the block D, thereby broadening the point of the tooth, as in Fig. 5, the beveled part being on the back thereof, it being noticed that the tooth as swaged is now exactly the same height as the abutment $D^2$. The saw is then released from the clamp K, the saw drawn out, shifted the distance of another tooth and returned against the frame, and the clamp K restored against the saw, after which the swaging operation is repeated, and thus the work continues until completed, it being evident that all of the teeth have their points at equal distances from the back of the saw-blade, while the teeth are swaged or spread on their points.

As shown in Fig. 6, the beveled portion of the tooth will be on the cutting-edge instead of on the back, as is the case when the saw is brought in contact with the die, as in Fig. 3, owing to the reversed position of the saw in the two operations.

I am aware that it is not new to swage saw-teeth by compressing the points of the same between a reciprocating die and a fixed die-block, and I therefore disclaim the same; but, Having fully described my invention, what I do claim as new, and desire to secure by Letters Patent, is—

1. In a saw-tooth-swaging machine, the frame A, in combination with the rotary die C, having a cut-away portion, C', and the block D, having abutment D², all substantially as and for the purpose set forth.

2. In a saw-tooth-swaging machine, the frame A, in combination with the rotary die C, having cut-away portion C', the block D, with abutment D², and die-support E, the periphery of the die being in contact with said support E, all substantially as described.

3. In a saw-tooth-swaging machine, a die, in combination with a die-block and die-support made interchangeable with each other in relation to the die, substantially as and for the purpose set forth.

4. In a saw-tooth-swaging machine, the slotted frame A, having a threaded boss, in combination with a grooved bar, G, the bolt H, the screw J, and pivoted clamp K, having the nose K', all substantially as and for the purpose set forth.

5. In a saw-swaging machine, the combination of a frame, a saw-support, a female die, and a male die having a corner or pinching-off edge or face, substantially as and for the purpose set forth.

J. F. TRIDELL.

Witnesses:
  A. R. FETTER,
  E. B. CHANDLER.